(12) United States Patent
Schönhuber et al.

(10) Patent No.: US 7,338,074 B2
(45) Date of Patent: Mar. 4, 2008

(54) GAS GENERATOR

(75) Inventors: Georg Schönhuber, Oberneukirchen (DE); Reed Inman, Landsham (DE)

(73) Assignee: TRW Airbag Systems GmbH, Aschau/Inn (DE)

( * ) Notice: Subject to any disclaimer, the term of this patent is extended or adjusted under 35 U.S.C. 154(b) by 271 days.

(21) Appl. No.: 10/736,146

(22) Filed: Dec. 15, 2003

(65) Prior Publication Data

US 2004/0124618 A1 Jul. 1, 2004

(30) Foreign Application Priority Data

Dec. 23, 2002 (DE) ............... 202 19 899 U

(51) Int. Cl.
*B60R 21/26* (2006.01)

(52) U.S. Cl. .............. 280/742; 280/741; 280/736

(58) Field of Classification Search ........... 280/742, 280/741, 736; 102/530, 531
See application file for complete search history.

(56) References Cited

U.S. PATENT DOCUMENTS

| | | | |
|---|---|---|---|
| 5,516,147 A * | 5/1996 | Clark et al. ............ | 280/737 |
| 5,551,725 A | 9/1996 | Ludwig | |
| 5,803,494 A | 9/1998 | Headley | |
| 5,951,040 A * | 9/1999 | McFarland et al. ...... | 280/736 |
| 6,131,948 A | 10/2000 | Cuevas | |
| 6,142,515 A | 11/2000 | Mika | |
| 6,314,889 B1 | 11/2001 | Smith | |
| 6,315,322 B1 | 11/2001 | Mika | |
| 6,422,601 B1 | 7/2002 | Quioc | |
| 6,612,326 B2 * | 9/2003 | Specht et al. ........... | 137/68.13 |
| 6,659,500 B2 | 12/2003 | Whang et al. | |
| 6,701,849 B2 * | 3/2004 | McFarland et al. ....... | 102/530 |
| 6,702,323 B2 * | 3/2004 | Goetz ................ | 280/736 |
| 6,764,096 B2 | 7/2004 | Quioc | |
| 6,860,511 B2 | 3/2005 | Patterson | |
| 6,886,338 B2 * | 5/2005 | Fischer et al. ......... | 60/632 |
| 6,966,578 B2 * | 11/2005 | Smith ................ | 280/736 |
| 6,997,477 B2 | 2/2006 | Quioc | |
| 2002/0005636 A1 | 1/2002 | McFarland et al. | |

FOREIGN PATENT DOCUMENTS

DE 19631315 2/1998

* cited by examiner

*Primary Examiner*—Paul N. Dickson
*Assistant Examiner*—Drew J. Brown
(74) *Attorney, Agent, or Firm*—Tarolli, Sundheim, Covell & Tummino LLP

(57) ABSTRACT

A gas generator includes a housing having an inner wall delimiting an igniter chamber peripherally, and at least one igniter opening into the igniter chamber. The gas generator further includes a cap arranged for displacement along the inner wall and delimiting the igniter chambe, said cap having a cylindrical peripheral wall and a radially extending cover wall. The peripheral wall has a first section extending from the cover wall in displacement direction (R) and a second section extending in a direction opposite thereto. The first and second sections lie against the inner wall and guide the cap during a displacement thereof. The cover wall is turned axially into the interior of the cap.

22 Claims, 2 Drawing Sheets

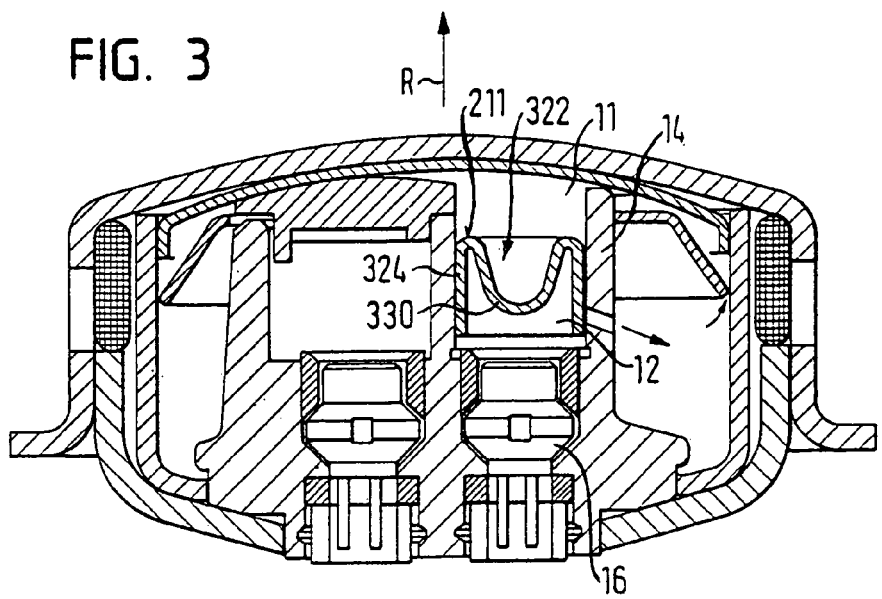
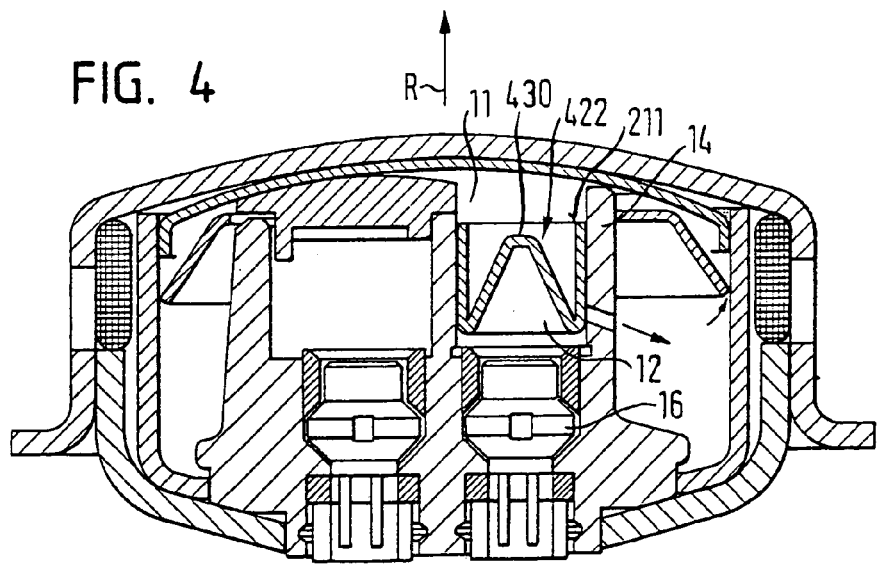
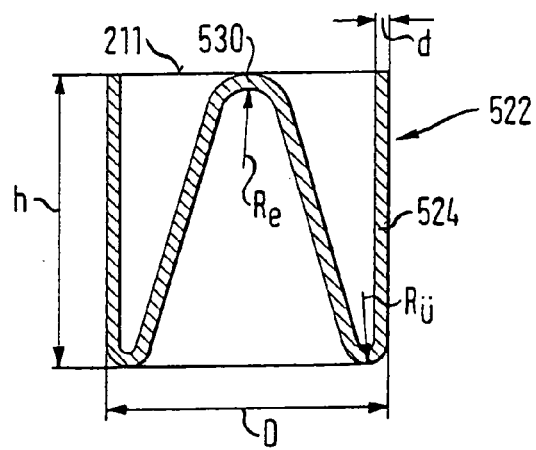

GAS GENERATOR

TECHNICAL FIELD

The invention relates to a gas generator.

BACKGROUND OF THE INVENTION

Known gas generators have a housing with an inner wall delimiting an igniter chamber peripherally, at least one igniter opening into the igniter chamber, and a cap arranged for displacement along the inner wall and delimiting the igniter chamber, which cap has a cylindrical peripheral wall and a radially extending cover wall. The cap is preferably constructed such that it covers the outflow opening before the activation of the gas generator and during the activation of the gas generator and the displacement of the cap, it exposes the outflow opening.

Such a gas generator is described, for example, in U.S. Pat. No. 6,315,322 B1.

The invention meets the problem of optimizing the behavior of such a gas generator shortly after its activation.

BRIEF SUMMARY OF THE INVENTION

According to the invention, a gas generator includes a housing having an inner wall delimiting an igniter chamber peripherally, and at least one igniter opening into the igniter chamber. The gas generator further includes a cap arranged for displacement along the inner wall and delimiting the igniter chamber, said cap having a cylindrical peripheral wall and a radially extending cover wall. The peripheral wall has a first section extending from the cover wall in displacement direction and a second section extending in a direction opposite thereto. The first and second sections lie against the inner wall and guide the cap during a displacement thereof. Together with the cover wall, the second section of the peripheral wall defines a precisely defined igniter chamber volume at the start of ignition of the gas generator. Owing to the long guidance of the cap, the displacement movement of the cap is able to be predetermined more precisely. After the displacement of the cap, it is also ensured by the first section and the cap shape as a whole that the volume available for the combustion of the propellant in the igniter chamber, and the increase in volume, is precisely defined. All these points contribute to making the ignition behavior of the gas generator precisely reproducible and able to be determined in a defined manner. When the cap initially closes an outflow opening in the inner wall, the moment of opening the outflow opening is likewise clearly defined by the cap shape.

These advantages are also achieved by a gas generator according to claim 14.

In the igniter chamber, preferably a propellant charge is contained, which can serve as a booster charge.

The sections of the peripheral wall are cylindrical in the embodiments shown here and have identical external diameters, so that the cap can be simply inserted into the preferably likewise cylindrical igniter chamber.

It has been found that a good guidance of the cap in the igniter chamber is to be achieved when the axial length of the first section corresponds approximately to the axial length of the second section.

In order to seal with respect to the exterior the volume surrounded by the second section and the cover wall, and the charge contained therein, and also in order to obtain a defined displacement resistance, at least the first section lies against the inner wall under prestress. The second section can also be prestressed accordingly.

A defined end of the displacement process and hence a defined maximum volume of the igniter chamber can be established by provision being made that the first section strikes against a housing part of the gas generator at the end of the displacement. The striking action can of course likewise take place at component separate from the housing and arranged in the gas generator. Preferably, the first section is constructed to be so rigid that it is not plastically deformed at the end of the displacement, in order to obtain the defined volume proportions.

In a preferred embodiment, the sections continue into each other in one piece. Also, the peripheral wall and the cover wall are connected with each other in one piece. This can be simply achieved when the cap is a one-piece sheet metal shaped part, the peripheral wall and the cover wall being formed by deformation of the sheet metal shaped part. In this way, a favorably priced production and also a low weight of the cap are the result.

The first and/or the second section can be at least partially realized so as to be double-walled, which also increases the stability of the cap. The double-walled construction can be achieved simply by a deformation process, for example.

Preferably, the peripheral wall is turned partially into the interior of the cap by plastic axial drawing of the cover wall, and is constructed so as to be double-walled in the turned-in region. For stability, it is advantageous here if the inner wall section lies against the outer one in the double-walled region of the peripheral wall.

BRIEF DESCRIPTION OF THE DRAWINGS

FIG. 3 shows a further variant of a gas generator;
FIG. 4 shows a variant of the gas generator of FIG. 3;
and
FIG. 5 shows a cap for use in a gas generator according to FIG. 3.

DETAILED DESCRIPTION OF THE PREFERRED EMBODIMENTS

Figure 1:
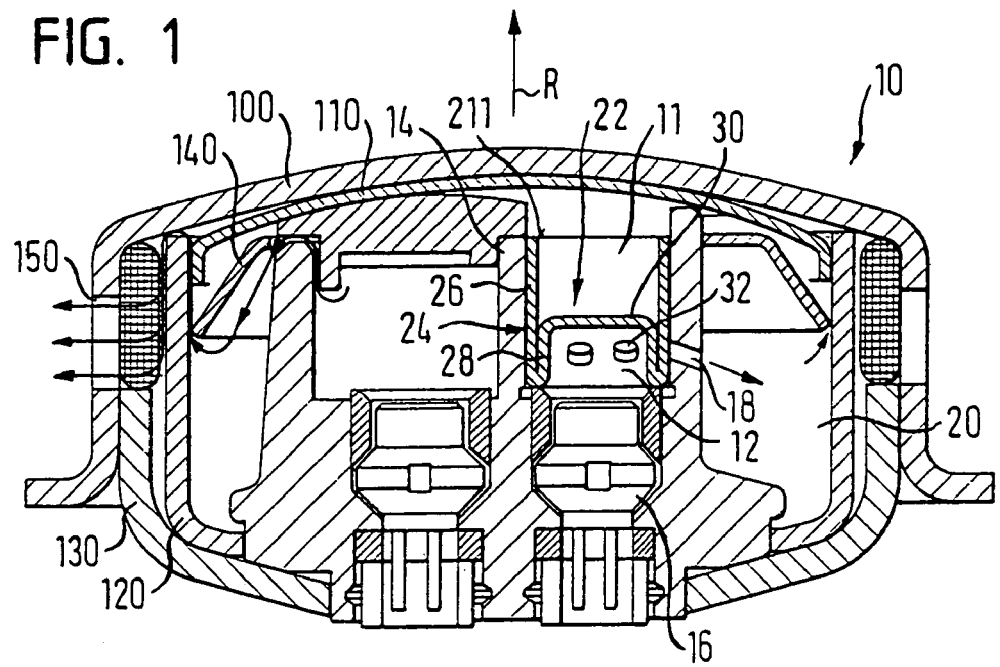
FIG. 1 shows a gas generator according to the invention.

In the figures, a gas generator 10 is shown, which corresponds in structure and function substantially to that described in U.S. Pat. No. 6,315,322 B1. With respect to the features known from this publication, reference is therefore to be made thereto.

The housing of the gas generator 10 has an inner wall 14 surrounding peripherally a clearance volume 11 and an igniter chamber 12 lying therebeneath, at the (lower, in the figures) end of which an igniter 16 is arranged such that its upper end opens into the igniter chamber 12. In the inner wall 14, outflow openings 18 are provided, only one of which is shown here, by means of which gas generated in the igniter chamber 12 can overflow into a combustion chamber 20. The combustion chamber 20 is filled with a suitable propellant which is not shown here.

A cap 22 which is displaceable along the inner wall 14 separates the clearance volume 11 from the igniter chamber 12. The cap 22 has a circular cylindrical peripheral wall 24 which, viewed in axial direction, has an upper first section 26 and a lower second section 28 adjoining thereto. In the example shown here, the diameters of the first and of the second section 26, 28 are identical, and the diameter of the cap 22 and of the igniter chamber 12 are selected such that both the first and the second section 26, 28 lie under prestress against the inner wall 14 over the entire periphery.

The cap 22 is displaceable in axial direction in displacement direction R (see arrow) against a resistance in the igniter chamber 12 which is determined by the prestress.

The second section 28 is delimited by a radially extending cover wall 30. In the volume formed by the cover wall 30 and the second section 28, a charge 32 is accommodated, which can undertake for example the function of a booster charge for the igniter 16.

The cap 22 is arranged such that it covers the outflow opening 18 before the ignition, i.e. activation, of the gas generator 10.

Before activation of the gas generator 10, the cap is positioned entirely at the lower end of the igniter chamber 12 (the lower edge of the section 28 abuts against a shoulder) and directly over the free end of the igniter 16. The volume of the igniter chamber 12 in which the propellant charge 32 is contained, is thereby precisely defined.

In the embodiment shown, the cap consists of a one-piece deformed sheet metal part, so that both the first section 26 and the second section 28 and also the peripheral wall 24 and the cover wall 30 continue into each other in one piece. The shape of the cap 22, an "H" in section, is achieved in that the peripheral wall is partially turned into the interior of the cap by plastic axial drawing of the cover wall. This leads to the first section 28 being constructed with double walls, the inner wall section lying against the outer one. It is also conceivable to additionally construct the first section 26 likewise with double walls.

Instead of being of metal, the cap 22 can also be produced from a suitable plastic or another suitable material; for example, it may also be constructed as a cast part or a punched bent part instead of a deformation part.

On activation of the gas generator 10, firstly the igniter 16 and shortly thereafter the propellant charge 32 are ignited. Owing to the gas development, at a moment after ignition determined inter alia by the displacement resistance of the cap 22 in the igniter chamber 12, the cap 22 is displaced upwards in direction R in the igniter chamber 12, the outflow opening 18 into the combustion chamber 20 being exposed. Through the hot gases flowing over, the propellant contained in the combustion chamber 20 is then ignited. The volume of the igniter chamber 12 increases in a manner which can be predetermined very precisely, and that of the clearance volume 11 decreases correspondingly.

The prestress of the peripheral wall 24 against the inner wall 14 is so great that there will also be ensured a sealing against the flowing over of gas into the clearance volume 11 or into the remaining gas generator 10.

On burning of the propellant charge situated in the igniter chamber 12, the peripheral wall 24 is pressed radially against the inner wall 14, the displacement resistance and the sealing action being increased.

The displacement of the cap 22 ends when the axial edge 211 (upper edge) of the first section 26, facing away from the igniter 16, strikes against a housing part or another component arranged in the housing of the gas generator 10. The cap 22 is constructed such that the first section 26 has such an inherent rigidity that on striking, no plastic deformation of the cap 22 takes place. Hereby, the igniter chamber volume, which influences the burning behavior of the propellant charge 32, remains precisely defined. In the example shown here, the axial length of the first section 26 corresponds approximately to the axial length of the second section 28.

Figure 2:
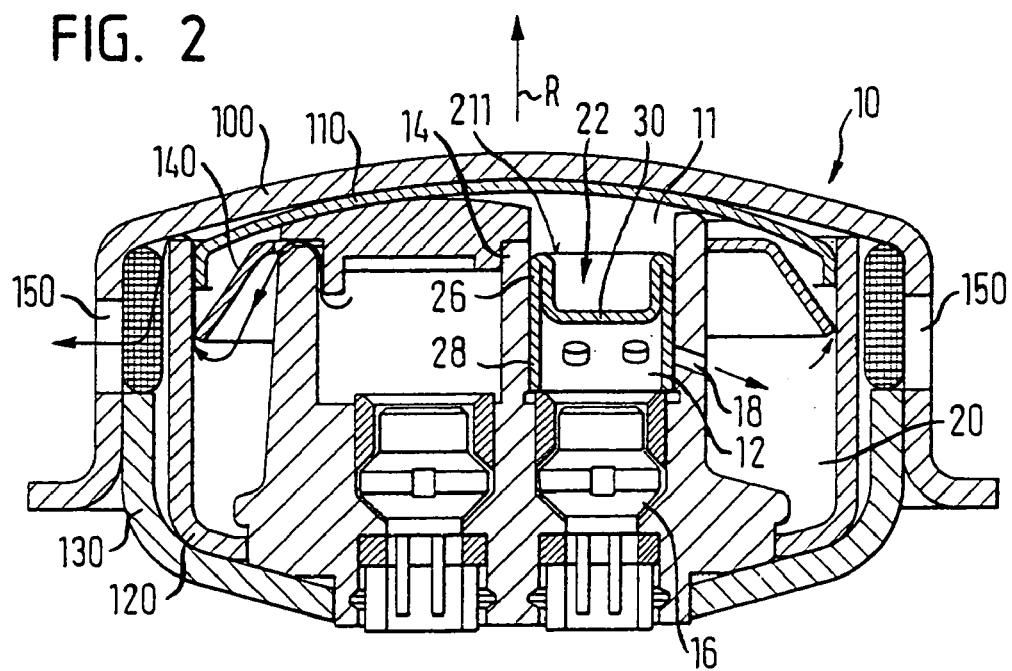
FIG. 2 shows a variant of the gas generator of FIG. 1.

The variant of the gas generator 10 shown in FIG. 2 differs from that shown in FIG. 1 merely in that the cap 22 is inserted into the igniter chamber 12 rotated through 180 degrees. In this case, therefore, the first section 26 is double-walled and the second section 28 is only one-walled in construction, whereby the stability of the first section 26 is higher than in the example in FIG. 1. Advantages and mode of operation of the gas generator 10 are as set forth above.

In both embodiments, the pressure increase in the gas generator leads to elastic deflections of housing parts 100 to 140 relative to each other. Through the relative movements of the housing parts 100 to 140 with respect to each other, flow paths become free (see arrows), so that the gas finally arrives out of the gas generator via outflow openings 150.

In FIGS. 3 to 5, further possible forms of cap are illustrated. Only the components relevant to the description are provided with reference numbers. The remaining construction and mode of operation of the gas generators shown is as described above.

In the variant shown in FIG. 3, the cap 322 has a cylindrical peripheral wall 324 and a cover wall 330 which is turned in in the center in a trough shape. The turning in is rounded off and can, for example, be hemispherical. The cover wall 330 is connected at one end of the cap 322 in one piece with the peripheral wall 324. The cap 322 is inserted into the gas generator such that the free end of the peripheral wall 324 is directed to the igniter 16. The igniter chamber 12 is delimited at the top by the cover wall 330 which is convex when viewed from the interior. The volume of the igniter chamber 12 can be defined exactly by the degree of turning in of the cover wall 330 in the direction of the igniter 16.

The peripheral wall 324 lies under prestress against the inner wall 14 of the igniter chamber 12, so that a defined resistance has to be overcome to displace the cap 322, and the igniter chamber 12 is sealed against the clearance volume 11 situated above the cap 322.

Here also, as in FIGS. 4 and 5, on burning of the charge (see FIG. 1) situated in the igniter chamber 12, the peripheral wall 324 is pressed radially against the inner wall 14, the displacement resistance and the sealing action being increased.

The cap 422 shown in FIG. 4 is shaped similarly to the cap 322 shown in FIG. 3. Here, in fact, the cover wall 430 is turned in in the shape of a truncated cone in cross-section, and in addition the cap 422 is inserted into the gas generator turned through 180 degrees with respect to the cap 322 of FIG. 3. Viewed from the direction of the igniter 16, the cover wall 430 therefore forms a concave boundary to the igniter chamber 12.

In FIG. 5 a further variant of a cap 522 is shown. The difference to the cap 422 illustrated in FIG. 4 lies in that the turning in of the cover wall 530 is constructed so as to be rounded off in the center of the cover wall, i.e. without edges. In FIG. 5 by way of example, measurements are indicated for the individual sections of the cap 522. These measurements can also be transferred to the other described caps 22, 322, 422. The diameter D of the cap 522 amounts to 13.3 mm, the height h to 13 mm, 0.6 mm is selected here as wall thickness d, and the radii of curvature of the turning in $R_e$ or at the transition between peripheral wall 524 and cover wall 530 $R_a$ amount to 1.5 mm and 0.9 mm, respectively.

Also in the embodiments according to FIGS. 3 to 5, at the end of the displacement path the upper axial edge 211 of the peripheral wall 324, 424, 524 strikes against the housing part 110.

The cover wall 30 of the embodiments according to FIGS. 1 and 2 can also have a shape corresponding to the cover wall 322, 422, 522.

The invention claimed is:

1. A gas generator, comprising
a housing having an inner wall (14) delimiting an igniter chamber (12) peripherally,
at least one igniter (16) opening into said igniter chamber (12), and
a cap (22) arranged for displacement along said inner wall (14) and delimiting said igniter chamber (12), said cap having a cylindrical peripheral wall (24) and a radially extending cover wall (30),
characterized in that said peripheral wall (24) has a first section (26) extending from said cover wall (30) in a displacement direction (R) and a second section (28) extending from said cover wall (30) in a direction opposite thereto,
said first and second sections (26, 28) lying against said inner wall (14) and guiding said cap (22) during a displacement thereof.

2. The gas generator according to claim 1, wherein said igniter chamber (12) contains a propellant charge (32).

3. The gas generator according to claim 1, wherein said first and second sections (26, 28) are cylindrical and have the same external diameter.

4. The gas generator according to claim 1, wherein an axial length of said first section (26) corresponds approximately to an axial length of said second section (28).

5. The gas generator according to claim 1, wherein at least said first section (26) lies against said inner wall (14) under prestress.

6. The gas generator according to claim 1, wherein said first section (26) strikes against a housing part of said gas generator (10) at an end of said displacement.

7. The gas generator according to claim 6, wherein said first section (26) is constructed so as to have such a rigidity that it is not plastically deformed at said end of said displacement.

8. The gas generator according to claim 1, wherein said first and second sections (26, 28) continue into each other in one piece.

9. The gas generator according to claim 1, wherein said peripheral wall (24) and said cover wall (30) are connected with each other in one piece.

10. The gas generator according to claim 1, wherein said cap (22) is a one-piece sheet metal shaped part, said peripheral wall (24) and said cover wall (30) being formed by deformation of said sheet metal shaped part.

11. The gas generator according to claim 1, wherein said inner wall (14) includes at least one outflow opening (18) of said igniter chamber (12) and said cap (22) is constructed such that, before activation of said gas generator (10), it covers said outflow opening (18) and, during said activation of said gas generator (10) and said displacement of said cap (22), it opens said outflow opening (18).

12. The gas generator according to claim 1 wherein said cap (22) is configured to be free of fracturing during displacement along said inner wall (14).

13. The gas generator according to claim 1 wherein said first section (26) extends in a direction away from said igniter (16) and terminates at a location downstream from said cover wall (30).

14. A gas generator, comprising
a housing having an inner wall (14) delimiting an igniter chamber (12) peripherally,
at least one igniter (16) opening into said igniter chamber (12), and
a cap (22) arranged for displacement along said inner wall (14) and delimiting said igniter chamber (12), said cap having a cylindrical peripheral wall (24) and a radially extending cover wall (30),
wherein said peripheral wall (24) has a first section (26) extending from said cover wall (30) in a displacement direction (R) and a second section (28) extending in a direction opposite thereto,
said first and second sections (26, 28) lying against said inner wall (14) and guiding said cap (22) during a displacement thereof, wherein at least one of said first and second sections (26, 28) at least partially is realized so as to be double-walled.

15. A gas generator, comprising
a housing having an inner wall (14) delimiting an igniter chamber (12) peripherally,
at least one igniter (16) opening into said igniter chamber (12), and
a cap (22) arranged for displacement along said inner wall (14) and delimiting said igniter chamber (12), said cap having a cylindrical peripheral wall (24) and a radially extending cover wall (30),
wherein said peripheral wall (24) has a first section (26) extending from said cover wall (30) in a displacement direction (R) and a second section (28) extending in a direction opposite thereto,
said first and second sections (26, 28) lying against said inner wall (14) and guiding said cap (22) during a displacement thereof, wherein said peripheral wall (24) is partially turned into an interior of said cap (22) by plastic axial drawing of said cover wall (30), and is constructed so as to be double-walled in said turned-in region.

16. The gas generator according to claim 15, wherein in said double-walled region of said peripheral wall (24) an inner wall section lies against an outer wall section.

17. A gas generator comprising a housing having an inner wall (14) delimiting an igniter chamber (12) peripherally, at least one igniter (16) opening into said igniter chamber (12), and a cap (22) arranged for displacement along said inner wall (14) and delimiting said igniter chamber (12), said cap (22) having a cylindrical peripheral wall (24) and a radially extending cover wall (30), wherein said cover wall (30) is turned axially into an interior of said cap (22) so that the cover wall (30) extends for at least half of a height (h) of the cap (22) into the interior of the cap (22), the degree of turning in of the cap (22) defining the volume of the igniter chamber (22).

18. The gas generator according to claim 17, wherein an axial edge (211) of said peripheral wall (24), facing away from said igniter (16), strikes against a housing part of said gas generator (10) at an end of a displacement of said cap (22).

19. The gas generator according to claim 17, characterized in that said cap (22) is a one-piece sheet metal shaped part, said peripheral wall (24) and said cover wall (30) being formed by deformation of said sheet metal shaped part.

20. The gas generator according to claim 17, wherein said inner wall (14) includes at least one outflow opening (18) of said igniter chamber (12) and said cap (22) is constructed such that, before activation of said gas generator (10), it covers said outflow opening (18) and, during said activation of said gas generator (10) and a displacement of said cap (22), it opens said outflow opening (18).

21. The gas generator according to claim 17 wherein said cap (22) is configured to be free of fracturing during displacement along said inner wall (14).

22. A gas generator comprising:
- a housing having an inner wall (14) delimiting an igniter chamber (12) peripherally;
- at least one igniter (16) opening into said igniter chamber (12); and
- a cap (22) arranged for displacement along said inner wall (14) and delimiting said igniter chamber (12), said cap having a cylindrical peripheral wall (24) and a cover wall (30) connected with one end of the peripheral wall, wherein said cover wall (30) is turned axially into an interior of said cap (22) and the cap (22) is inserted into the igniter chamber (12) so that the cover wall (30) is at least partially positioned between a free end of the peripheral wall (24) and the igniter (16).

* * * * *